US010430845B2

(12) United States Patent
Koretz et al.

(10) Patent No.: US 10,430,845 B2
(45) Date of Patent: Oct. 1, 2019

(54) SYSTEMS AND METHODS FOR AUTOMATED PURCHASE REQUESTS

(75) Inventors: David A. Koretz, Rochester, NY (US); Rob Chamberlin, Webster, NY (US); James Simpson, Rochester, NY (US)

(73) Assignee: ADVENTIVE, INC., Rochester, NY (US)

( * ) Notice: Subject to any disclaimer, the term of this patent is extended or adjusted under 35 U.S.C. 154(b) by 351 days.

(21) Appl. No.: 11/584,639

(22) Filed: Oct. 23, 2006

(65) Prior Publication Data

US 2008/0195506 A1    Aug. 14, 2008

(51) Int. Cl.
*G06Q 30/06* (2012.01)
*G06Q 40/00* (2012.01)

(52) U.S. Cl.
CPC ................. *G06Q 30/0603* (2013.01)

(58) Field of Classification Search
CPC ................. G06Q 30/02; G06Q 40/00
USPC ........................................ 705/35–38
See application file for complete search history.

(56) References Cited

U.S. PATENT DOCUMENTS

| | | |
|---|---|---|
| 5,101,425 A | 3/1992 | Darland et al. |
| 5,210,789 A | 5/1993 | Jeffus et al. |
| 5,442,707 A | 8/1995 | Miyaji et al. |
| 5,509,074 A | 4/1996 | Choudhury et al. |
| 5,551,030 A | 8/1996 | Linden et al. |
| 5,615,268 A | 3/1997 | Bisbee et al. |
| 5,617,114 A | 4/1997 | Bier et al. |
| 5,640,577 A | 5/1997 | Scharmer |
| 5,694,563 A | 12/1997 | Belfiore et al. |
| 5,727,057 A | 3/1998 | Emery et al. |
| 5,737,424 A | 4/1998 | Elteto et al. |
| 5,774,668 A | 6/1998 | Choquier et al. |
| 5,790,790 A | 8/1998 | Smith et al. |
| 5,790,793 A | 8/1998 | Higley |
| 5,794,207 A | 8/1998 | Walker et al. |
| 5,794,259 A | 8/1998 | Kikinis |

(Continued)

OTHER PUBLICATIONS

MasterCard Worldwide, "MasterCard Corporate Purchasing Card", Jan. 7, 2006 (Year: 2006).*

(Continued)

*Primary Examiner* — Ryan D Donlon
*Assistant Examiner* — Irene S Kang
(74) *Attorney, Agent, or Firm* — Pepper Hamilton LLP (57) ABSTRACT

A purchase request system efficiently procures goods and services by recognizing purchase authority levels of users within an enterprise, division, or project team. Administrators establish authority levels to ensure that purchase requests within a user's authority level are automatically processed and submitted to vendors for fulfillment of orders, while purchase requests beyond a user's authority level are routed according to a determined protocol. Determined protocols include routing the purchase request to a designated user with a different authority level for disposition, rejection of the purchase request, or modification of the purchase request in accordance with the determined protocol. Users may select from multiple payment methods to complete a purchase transaction and may access the purchasing system in real time to determine the status of an order at any point in the life cycle of the purchase request, from submission of the request to payment for received goods and services.

27 Claims, 4 Drawing Sheets

(56) References Cited

U.S. PATENT DOCUMENTS

| | | | |
|---|---|---|---|
| 5,802,518 | A | 9/1998 | Karacy et al. |
| 5,805,811 | A | 9/1998 | Pratt et al. |
| 5,835,896 | A | 11/1998 | Fisher et al. |
| 5,845,281 | A * | 12/1998 | Benson et al. .................... 707/9 |
| 5,848,131 | A | 12/1998 | Moore et al. |
| 5,848,161 | A | 12/1998 | Luneau et al. |
| 5,855,006 | A | 12/1998 | Huemoeller et al. |
| 5,870,470 | A | 2/1999 | Johnson et al. |
| 5,870,544 | A | 2/1999 | Curtis |
| 5,875,296 | A | 2/1999 | Shi et al. |
| 5,878,141 | A | 3/1999 | Daly et al. |
| 5,890,138 | A | 3/1999 | Godin et al. |
| 5,893,118 | A | 4/1999 | Sonderegger |
| 5,895,454 | A | 4/1999 | Harrington |
| 5,897,622 | A | 4/1999 | Blinn et al. |
| 5,899,980 | A | 5/1999 | Wilf et al. |
| 5,905,973 | A | 5/1999 | Yonezawa et al. |
| 5,917,491 | A | 6/1999 | Bauersfeld |
| 5,940,807 | A | 8/1999 | Purcell |
| 5,946,665 | A | 8/1999 | Suzuki et al. |
| 5,948,040 | A | 9/1999 | DeLorme et al. |
| 5,956,709 | A | 9/1999 | Xue |
| 5,960,411 | A | 9/1999 | Hartman et al. |
| 5,963,949 | A | 10/1999 | Gupta et al. |
| 5,970,475 | A * | 10/1999 | Barnes et al. ............. 705/26.35 |
| 5,974,441 | A | 10/1999 | Rogers et al. |
| 5,987,425 | A | 11/1999 | Arnold et al. |
| 5,991,740 | A | 11/1999 | Messer |
| 5,999,914 | A | 12/1999 | Blinn et al. |
| 5,999,938 | A | 12/1999 | Bliss et al. |
| 6,006,332 | A | 12/1999 | Rabne et al. |
| 6,058,417 | A | 5/2000 | Hess et al. |
| 6,065,046 | A | 5/2000 | Feinberg et al. |
| 6,085,166 | A | 7/2000 | Beckhardt et al. |
| 6,219,669 | B1 | 4/2001 | Haff et al. |
| 6,266,651 | B1 | 7/2001 | Woolston |
| 6,269,135 | B1 | 7/2001 | Sander |
| 6,369,840 | B1 | 4/2002 | Barnett et al. |
| 6,598,027 | B1 | 7/2003 | Breen et al. |
| 6,647,370 | B1 | 11/2003 | Fu et al. |
| 6,658,473 | B1 | 12/2003 | Block et al. |
| 6,763,335 | B1 | 7/2004 | Nanbu et al. |
| 6,850,899 | B1 * | 2/2005 | Chow ................... G06Q 30/06 705/26.8 |
| 6,876,977 | B1 * | 4/2005 | Marks ................... G06Q 30/06 705/26.62 |
| 6,879,691 | B1 | 4/2005 | Koretz |
| 6,938,256 | B2 | 8/2005 | Deng et al. |
| 6,986,076 | B1 | 1/2006 | Smith et al. |
| 6,993,572 | B2 | 1/2006 | Ross, Jr. et al. |
| 7,124,101 | B1 | 10/2006 | Mikurak |
| 2001/0049613 | A1 | 12/2001 | Gramann, III et al. |
| 2002/0032589 | A1 | 3/2002 | Shah |
| 2002/0083008 | A1 | 6/2002 | Smith et al. |
| 2002/0087541 | A1 | 7/2002 | Ceton et al. |
| 2002/0099576 | A1 | 7/2002 | MacDonald et al. |
| 2003/0023463 | A1 | 1/2003 | Dombroski et al. |
| 2003/0120526 | A1 | 6/2003 | Altman et al. |
| 2003/0135507 | A1 | 7/2003 | Hind et al. |
| 2004/0010451 | A1 | 1/2004 | Romano et al. |
| 2004/0015380 | A1 | 1/2004 | Timmins |
| 2004/0039626 | A1 | 2/2004 | Voorhees |
| 2004/0139154 | A1 | 7/2004 | Schwarze |
| 2005/0010483 | A1 * | 1/2005 | Ling ............................... 705/26 |
| 2005/0044003 | A1 | 2/2005 | O'Keeffe et al. |
| 2005/0091111 | A1 | 4/2005 | Green et al. |
| 2005/0097204 | A1 | 5/2005 | Horowitz et al. |
| 2005/0149417 | A1 | 7/2005 | Crescenzo et al. |
| 2005/0204367 | A1 | 9/2005 | Minium, Jr. et al. |
| 2005/0223392 | A1 | 10/2005 | Cox et al. |
| 2006/0020950 | A1 | 1/2006 | Ladd et al. |
| 2006/0206363 | A1 | 9/2006 | Gove |
| 2007/0198432 | A1 * | 8/2007 | Pitroda et al. .................. 705/64 |
| 2007/0233556 | A1 | 10/2007 | Koningstein |
| 2007/0240029 | A1 | 10/2007 | Kitada et al. |
| 2010/0017874 | A1 | 1/2010 | Piccinini et al. |

OTHER PUBLICATIONS

Miller, Michael "The Complete Idiot's Guide to Online Auctions," (1999).

BuyTextiles.com (http://www.ecompartners.com/buytextiles/htm/listing_help.htm), 1-4.

David Koretz.com (http://dkoretz.typepad.com/rants/2006/06/featuretisement.html), 1-3 (2006).

International Search Report for International Patent Application No. PCT/US07/71521, dated Jan. 7, 2008.

International Search Report for International Patent Application No. PCT/US07/71524, dated Jul. 15, 2008.

International Search Report for International Patent Application No. PCT/US07/71525, dated Aug. 27, 2008.

International Search Report for International Patent Application No. PCT/US09/35127, dated Apr. 13, 2009.

Written Opinion of the International Searching Authority for International Patent Application No. PCT/US09/35127, dated Apr. 13, 2009.

* cited by examiner

SYSTEMS AND METHODS FOR AUTOMATED PURCHASE REQUESTS

FIELD OF THE INVENTION

The present invention relates to purchase request systems and methods of purchasing goods and services. More particularly, the systems and methods of the present invention relate to automation of purchase requests in software applications.

BACKGROUND

Managing overhead costs, including procuring and tracking purchases of goods and services, remains a difficult, time-consuming and expensive challenge. As the number and types of goods and services consumed by the business enterprise increases, the amount of time and effort required for procurement of these resources increases. Automated systems for procuring items are available, however, these conventional purchase request systems have typically been the domain exclusively of large enterprises. These systems often do not meet the needs of the average small business or limit their entry by being cost-prohibitive. They are designed for large purchases that often have complicated approval processes involving many different parties. These systems are complex to deploy and are expensive to operate and maintain, often requiring dedicated hardware and software investments and extensive programming rules. They are often available only as part of a larger enterprise-wide system such as those offered by SAP or Oracle. Further, these conventional systems often do not account for Web-based purchasing of every day items such as office supplies, technology equipment, and Web services.

Small businesses need an inexpensive and efficient purchase request system that enables them to quickly approve or decline purchases and automatically approve routine purchase requests. The systems and methods of the present invention serve this market very well and overcome previous limitations of conventional purchase request systems.

For example, conventional purchase request systems require intervention by multiple parties at multiple points in the purchase process. As an example, U.S. Pat. No. 6,763,335 (the '335 patent) discloses a purchase request apparatus and system in a client server environment where a requester specifies an article for purchase and an approver determines approval or rejection of the purchase request. However, this type of system has many limitations. For example, it is designed only for physical articles, and does not account for the purchase of services or other non-tangible goods. More importantly, there is no provision to efficiently process requests for recurring services based, not on a fixed price, but rather on a monthly fee. These types of existing purchase request systems do not adequately address recurring purchases where there is no set dollar amount, but rather a recurring charge that occurs on a periodic basis. Additionally, purchase request systems such as those described by the '335 patent do not permit a user to set a hierarchical structure of the organization or group to allow other parties such as managers or supervisors to specify pre-approved purchase limits for users based on a dollars per purchase or dollars per month basis. These inflexible systems force managers to manually approve each purchase request and do not work well with sales organizations, senior managers, and other parties that typically have pre-approved budgets, expense accounts, or other standing purchase limits.

Thus, there is a need for a system that can automatically determine if a user has the proper authority to purchase a particular good or service without requiring excessive manual intervention. Also, there is a need for a purchase request system that will selectively route purchase requests to users with appropriate authorization levels with which the goods or services may be procured without additional levels of review. Moreover, there is a need for a purchase request system that facilitates timely and efficient tracking and accounting of the ordered resources.

Additionally, traditional purchase request systems require users to comply with standard data formats, often filling out long and arduous paper or electronic forms. They then require the person approving the purchase to independently look through catalogs or Web sites to review the product. There is a need for a purchase request system that is Web-based and has the flexibility to account for purchasing from any vendor, not merely an approved list of vendors. Further, there is a need for a system that is capable of queuing a transaction so the good or service may be later purchased easily by storing shopping cart or other order data where it is stored on a vendor's website. This eliminates the need for a configurable product such as a computer or website hosting to be re-configured by a manager approving the purchase request, thus saving time and reducing data entry errors. Such a method would also enable the user to simply drag and drop electronic product data into the purchase request, thereby eliminating data entry.

SUMMARY

The present invention provides technologies for systems and methods for electronically purchasing a product or service including specifying users and groups of users and their stipulated approval levels that may be used to conduct purchase transactions of products, including goods and services, and the like. The term "product" as used in this disclosure should be understood to include goods and services, including tangible and intangible goods and services. The systems and methods of the present invention define routing actions based on the approval level and identity of the specified user. Routing actions may be defined at any point in the transaction process, including prior to a user attempting a transaction or submitting a purchase request.

The systems and methods of the present invention identify available payment options to complete the transaction based upon the submitted transaction and the specified user and allow a user to select a payment option. Additionally, a specified user may submit a purchase request indicating the selected payment option, and the system will determine if the submitted purchase request complies with stipulated administrative criteria, including the approval level of the user. If the submitted purchase request is in compliance, the product may be purchased. If the system determines that the submitted purchase request does not comply with the stipulated administrative criteria, including the approval level of the specified user, the purchase request may be routed according to defined routing actions established by a system administrator.

A process for automating purchase requests within a software application in accordance with embodiments of the present invention includes determining when an attempted transaction by the user of an application requires a purchase request or the user chooses a purchase request, and then automatically generating the purchase request or automatically routing the purchase request based on pre-set criteria.

The present invention recognizes purchase authority levels that are assigned to each user within an enterprise by an administrator. Depending upon the settings established for the users by the administrator, when a user exceeds their purchase authority (for example, attempting to submit a purchase request in excess of a pre-set dollar limit) any purchase requests may be denied or automatically routed to another user who may take additional action to process the purchase request. Similarly, if a user exceeds their purchase authority for a given time period, by way of example only attempting to order more than a pre-set dollar limit in a given month, the system follows administrator-set protocols to automatically address the unauthorized request and route the request for disposition accordingly.

The additional action may include reviewing the purchase request with the originating user and approving, rejecting, or otherwise disposing of the request, or it may be the case where the system of the present invention automatically routes the purchase request to a user with higher authority as stipulated by the administrator. The protocols established by the administrator may be to automatically reject the request, or may be to automatically route the request to a user with a higher purchase limit, for example. Regardless of the established protocols, the system and method of the present invention automatically takes the next step in the procurement process rather than have the purchase request reach a dead end waiting for manual intervention.

In addition, the systems and methods of the present invention further support multiple payment options in concert with the purchase requests and allow the administrator to select desired payment options for given transactions from which a user may select. Payment options may include, but are not limited to, credit card, debit card, ACH, PayPal, line of credit, electronic check, net terms account, Google Gbuy, and the like.

The present invention solves a number of problems by enabling automation of purchase requests and enabling users to transition between real-time purchase tracking using the payment option methods stored in their individual user accounts. The system further automates workflow so approved purchase requests are directly forwarded to the vendor for fulfillment, thereby conserving procurement resources, time, and effort.

The present invention provides a number of advantages over conventional purchase request systems, including providing an effective and automated method for users of a Web-based or client-server software application to complete purchases quickly and easily without generating additional paperwork. The present invention provides the user with a fast, efficient, and accurate procurement experience by reducing the time it takes to complete, approve, submit, and track purchase requests, and automatically routing purchase requests that fall within established protocols.

The present invention also provides a comprehensive historical record of requested purchase transactions regardless of the manner in which the purchase request is disposed. This data is stored electronically and can be formatted, exported, and integrated with financial applications for efficient automated accounting and auditing procedures. The data is stored in a standardized format, such as XML, for example, enabling many third-party applications to use the data. Whether a purchase request is completed, submitted, approved, rejected, filled, shipped, delivered, and other dispositions, the present invention reduces the amount of labor required to track and complete individual transactions by automatically routing transactions according to established protocols.

Further, the present invention enables users to store shopping cart data of items configured by the user in an electronic format, so a purchasing administrator or other user may complete a transaction without any manual data entry and without risk of data entry error.

These and other advantages and features of the present invention will become more apparent from the following detailed description of the embodiments of the present invention when viewed in conjunction with the accompanying drawings.

BRIEF DESCRIPTION OF THE DRAWINGS

The accompanying drawings illustrate an embodiment of the invention and depict the above-mentioned and other features of this invention and the manner of attaining them. In the drawings.

DETAILED DESCRIPTION

The following detailed description of the invention refers to the accompanying drawings and to certain embodiments, but the detailed description of the invention does not limit the invention. The scope of the invention is defined by the appended claims and equivalents as it will be apparent to those of skill in the art that various features, variations, and modifications can be included or excluded based upon the requirements of a particular use.

Figure 1:
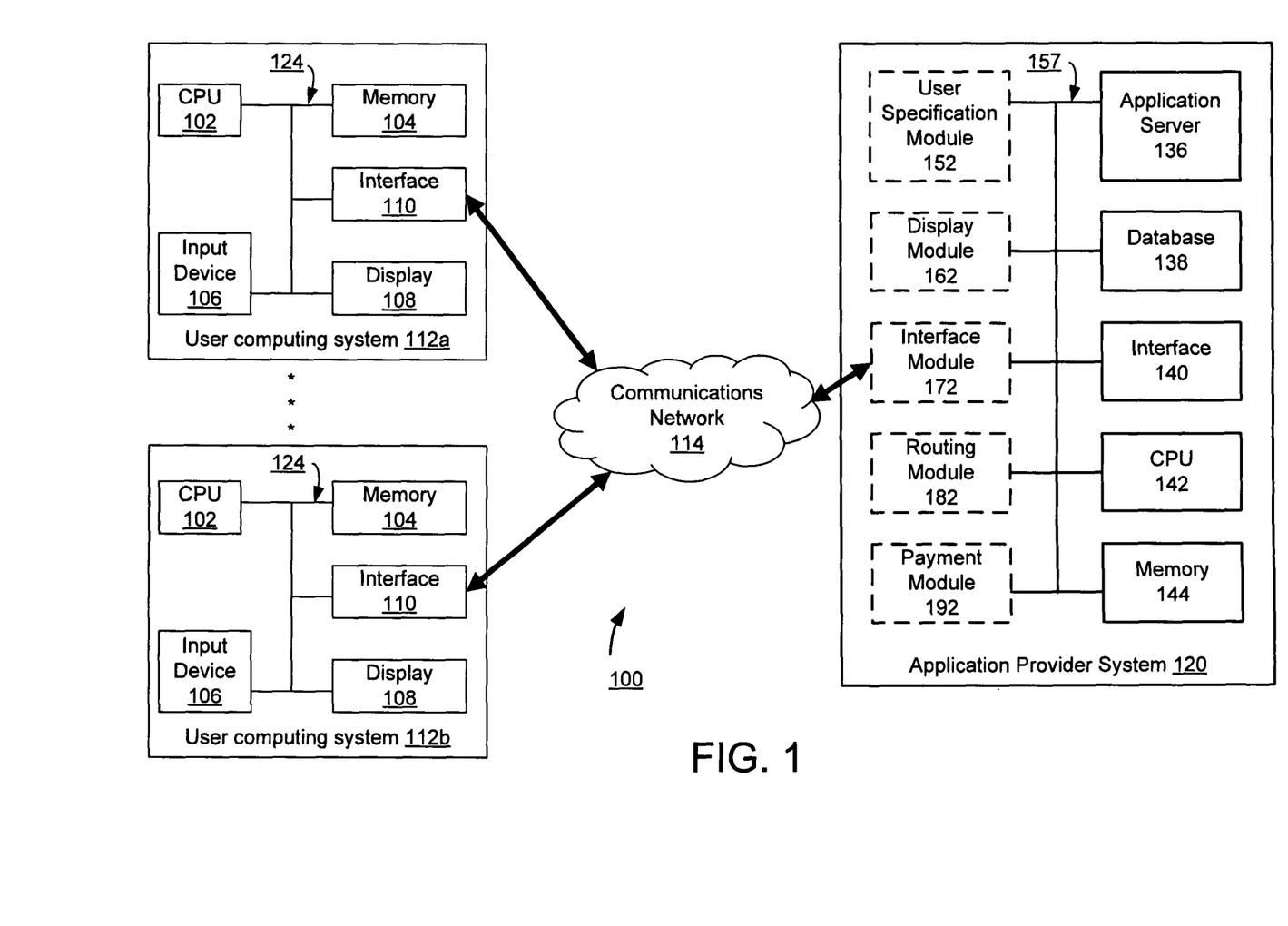
FIG. 1 is a block diagram of a system that automates purchase requests within an application in accordance with embodiments of the present invention.

FIG. 1 illustrates an exemplary electronic purchase request system 100 in which concepts and methods consistent with the present invention may be performed. As shown in FIG. 1, system 100 comprises a number of user computing systems 112a, 112b placed in a variety of physical locations in which they may be used to access application provider system 120 via communications network 114. For clarity and brevity, two user computing systems 112a, 112b are shown, but it should be understood that any number of user computing systems may use the system 100 with which to access application provider system 120.

User computing systems 112a, 112b may access application provider system 120 through any communications network 114 including the Internet, telecommunications networks in any suitable form, local area networks, wide area networks, wireless communications networks, cellular communications networks, G3 communications networks, Public Switched Telephone Networks (PSTNs), Packet Data Networks (PDNs), intranets, or any combination of these networks, or any group of two or more computing devices linked together with the ability to communicate with each other.

As illustrated in FIG. 1, communications network 114 may be the Internet where user computing systems 112a, 112b are nodes on the communication network 114 as is application provider system 120. User computing systems 112a, 112b and application provider system 120 may be any suitable device capable of providing and receiving data to and from another device. For example, these devices may be any suitable servers, workstations, PCs, laptop computers, PDAs, Internet appliances, handheld devices, cellular telephones, wireless devices, other devices, and the like, capable of performing the processes of the exemplary embodiments of FIGS. 1-2. The devices and subsystems of the exemplary embodiments of FIGS. 1-2 can communicate with each other using any suitable protocol and can be implemented using one or more programmed computer systems or devices. In general, these devices may be any type of computing device connected to a network and interacting with application programs.

The application programs may be resident on a computer readable medium and include programmed instructions for automating purchase requests within an enterprise application including determining when an attempted transaction by a user of an application requires a purchase request and then automatically generating the purchase request and automatically routing the purchase request based on pre-set criteria.

Automated purchase request system 100 operates within an application program in accordance with embodiments of the present invention and is illustrated in FIG. 1. The system 100 includes an application provider system 120, user computing systems 112a, 112b, and a communications network 114. Purchase request system 100 can comprise other numbers and types of server systems, systems, devices, equipment, and/or components in other configurations. The present invention provides a number of advantages including providing an efficient and automatic method for users of Web-based applications, client-server software applications, and the like, to automate purchase requests and purchase and procurement management within an enterprise, division, or project team.

User computing systems 112a, 112b include CPU 102, memory 104, interface 110, display 108, and input device 106 connected by bus 124 so as to operate in concert with an application server 136 in application provider system 120.

Application provider system 120 provides one or more applications to the user computing systems 112a, 112b, such as a purchase request application, a purchase request Web page, or the like. Application provider system 120 includes central processing unit (CPU) 142, memory 144, interface 140, database 138, and application server 136, which are coupled together by a bus 157 or other communication link, to instantiate a user specification module 152 that specifies an approved user of the electronic purchasing system 100 and an approval level of the specified user, an interface module 172 that receives submitted transactions and submitted purchase requests by the specified user to purchase a product, a payment module 192 that identifies and selects available payment options to complete the transaction based upon the submitted transaction and the specified user, and a routing module 182 that defines routing actions based on the approval level and identity of the specified user, determines if a submitted purchase request complies with the approval level of the specified user, and accepts the submitted purchase request if it is determined that the submitted purchase request complies with the approval level of the specified user and routes the submitted purchase request based on the defined routing actions if it is determined that the submitted purchase request does not comply with the approval level of the specified user. Additionally, a display module 162 may be used to provide visual or other sensory-perceptible representation of the purchase request process of the present invention. Display module 162 may also be used to connect a user to a vendor so that products available for electronic purchase may be viewed and selected by the user accordingly.

In the application provider system 120 depicted in FIG. 1, the physical components CPU 142, memory 144, application server 136, database 138, and interface 140 are illustrated using solid lines, while the instantiated modules 152, 162, 172, 182, 192 are shown using dashed lines, although other numbers and types of each of the components and modules and other configurations and locations for the components and modules may be used.

The processor CPU 142 in the application provider system 120 executes a program of stored instructions for one or more aspects of the present invention as described herein, including instructions for automating purchase requests in an enterprise, division, or project team. The memory 144 stores these programmed instructions for one or more aspects of the present invention as described herein, although some or all of the programmed instructions could be stored and/or executed elsewhere. A variety of different types of memory storage devices, such as a random access memory (RAM), flash memory, read only memory (ROM) floppy disks, hard disks, CD ROM, DVD ROM, or other computer-readable medium is read from and/or written to by a magnetic, optical, or other computer medium reading and writing system that is coupled to the processor CPU 142 and can be used to store and retrieve data in the memory 144 in the application provider system 120. The interface 140 in the application provider system 120 is used to operatively couple and communicate between the application provider system 120 and the user computing systems 112a, 112b via communications network 114, although other types and numbers of connections and other suitable configurations and types of communication networks may be used. In a particular embodiment, the communication network 114 is via TCP/IP over Ethernet and uses industry-standard protocols including SOAP, HTTP, HTTPS, XML, LDAP, SNMP, UDDI, WSDL, and the like, although other types and numbers of communication systems, such as a direct connection, a local area network, a wide area network, modems and phone lines, e-mail communiqués, and/or wireless communication technology, each having their own communications protocols, may be used.

Each of the user computing systems 112a, 112b enables a user to utilize an application from the application provider system 120, such as a purchase request application, for example. Each of the user computing systems 112a, 112b includes a central processing unit (CPU) 102, a memory 104, user input device 106, a display 108, and an interface 110, which are coupled together by a bus or other link 124, although one or more of the user computing systems 112a, 112b may comprise other numbers and types of components and systems in other configurations. The application instructions to utilize the purchase request application may be executed client-side, server-side, or asynchronously depending upon the nature of the given request. In the following example, application provider system 120 is shown as executing a program of stored computer-readable instructions for one or more aspects of the present invention as described and illustrated herein, including the process for automating purchase requests, although the method of the present invention may be performed by any suitable computing device, including, by way of example only, user computing system 112a, 112b. In the following example, CPU 142 in the application provider system 120 executes instructions for the automated purchase request method of the present invention, although CPU 142 may also execute other types of programmed instructions.

In the user computing system 112a, 112b, memory 104 stores these programmed instructions for interacting with application provider system 120 to carry out one or more aspects of the present invention as described herein, including the process for automating purchase requests, although some or all of the programmed instructions could be stored and/or executed elsewhere. A variety of different types of memory storage devices, such as a random access memory (RAM), flash memory, or a read only memory (ROM) in the system or a floppy disk, hard disk, CD ROM, or other computer readable medium is read from and/or written to by a magnetic, optical, or other computer medium reading and writing system that is coupled to one or more processors, may be used for the memory 104.

The user input device 106 is used to input selections to user computing systems 112a, 112b to interact with application provider system 120 via communications network 114, such as user data including payment method information, such as credit card information, debit card information, and other forms of electronic payment information, and the like. Other personal data and enterprise data such as account numbers and the like, may be used to interact with applications and transactional features, although the user input device 106 may be used to input other types of data and interact with other modules. The user input device 106 includes a computer keyboard (not shown) and a computer mouse (not shown), although other types and numbers of user input devices 106 may be used.

The display 108 is used to show data and information to the user, such as the entries and actions input and output to and from the purchase request system 100, although other types of data and information may be displayed, and other manners of providing notification can be used, such as via email, page, SMS, and Web. The display 108 comprises a computer display screen, such as a CRT or LCD screen by way of example only, although other types and numbers of displays could be used.

The interface 110 is used to operatively couple and communicate between the user computing systems 112a, 112b and interface module 172 in application provider system 120 via communications network 114, although other types and numbers of connections and other configurations and other types of communication networks may be used.

In application provider system 120, CPU 142, memory 144, interface 140, database 138, and application server 136 are configured to instantiate user specification module 152, display module 162, interface module 172, routing module 182, and payment module 192.

Figure 2A:
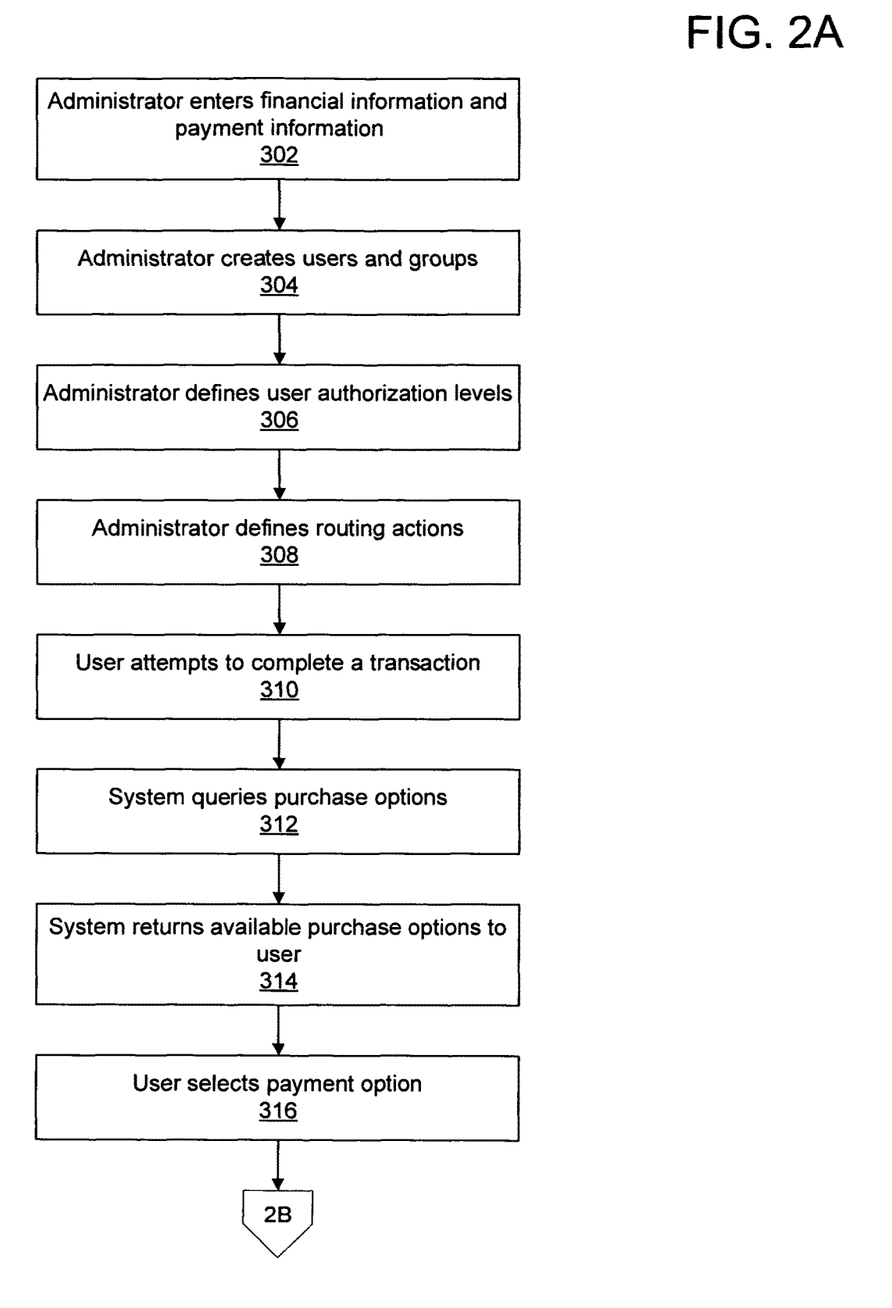
FIGS. 2A-2C are a flow chart of a process for automating purchase requests within an application in accordance with embodiments of the present invention.
Figure 2B:
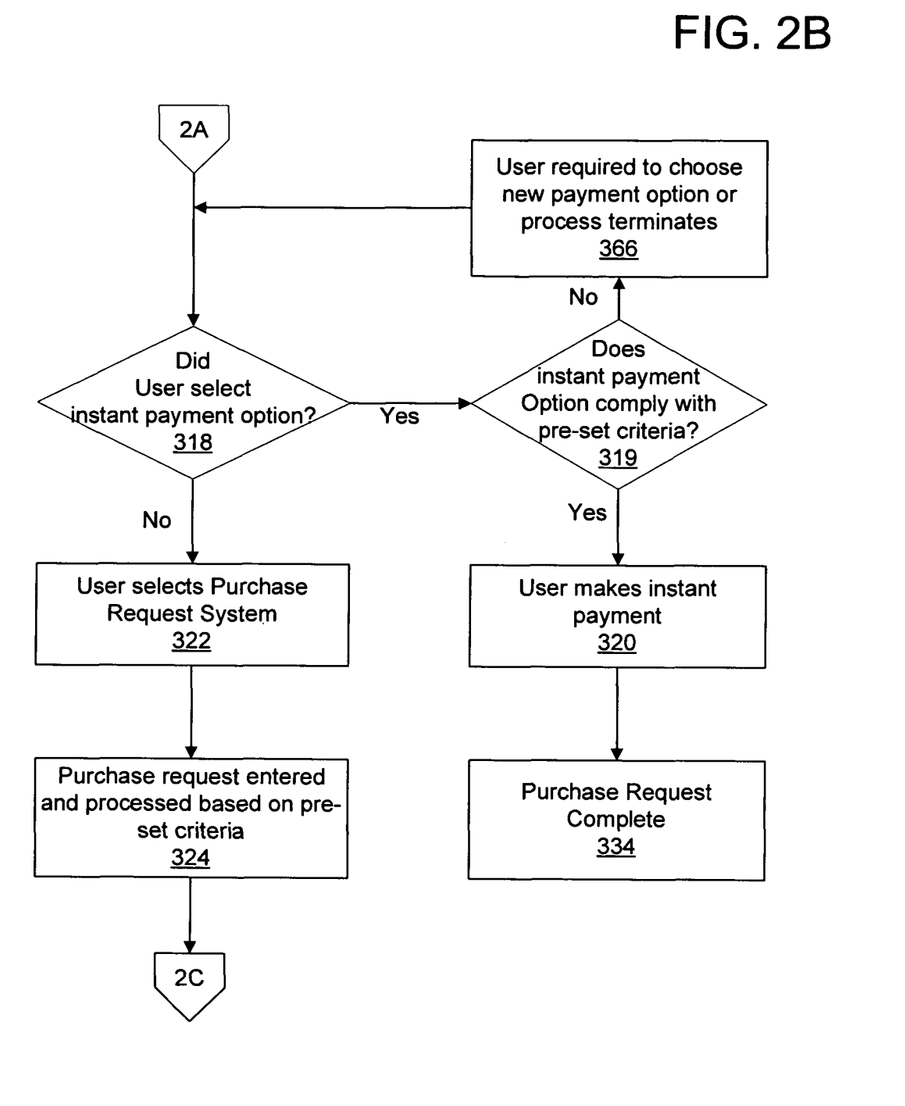
Figure 2C:
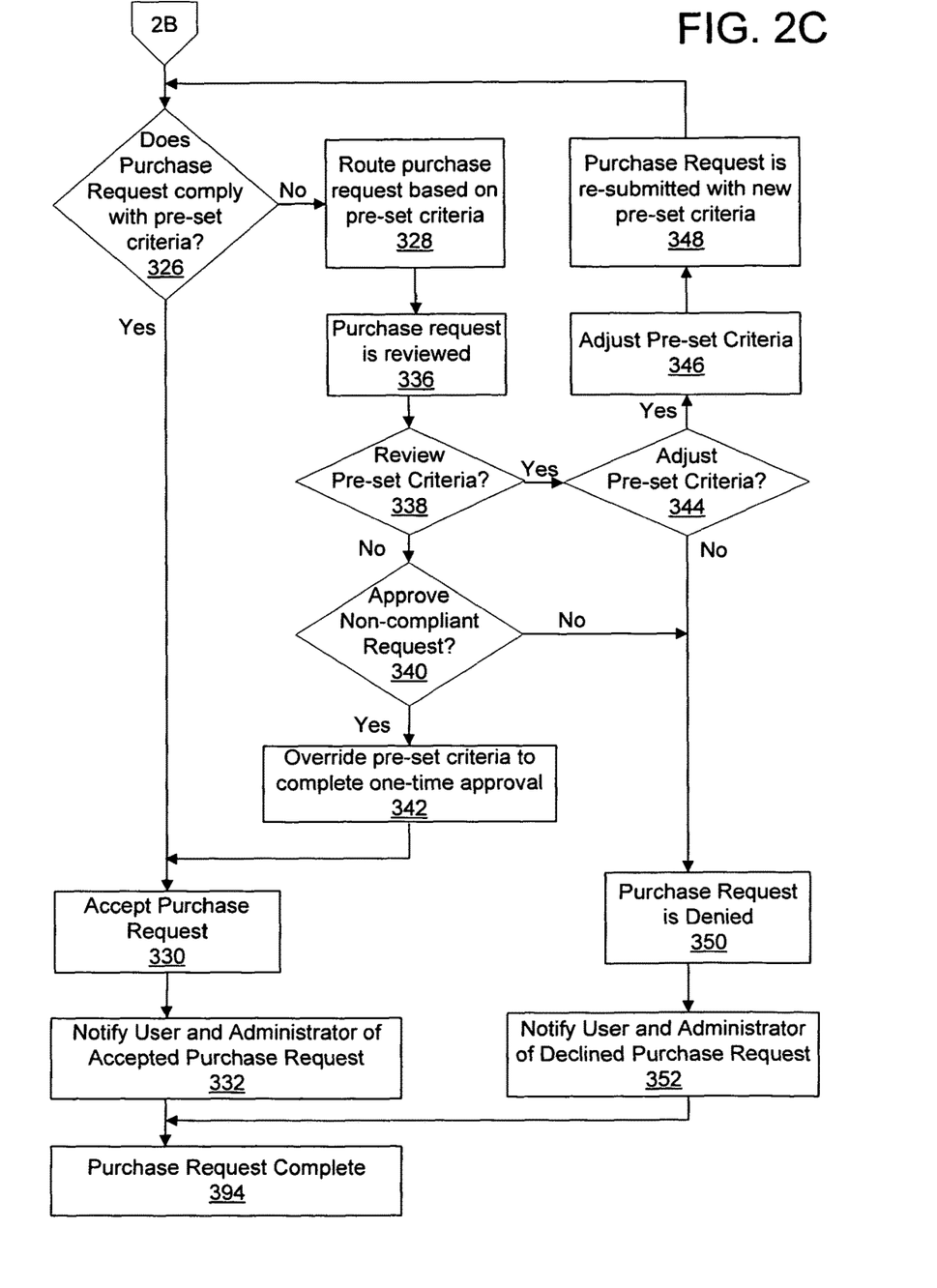

Referring to FIG. 1, and as described in detail with regard to the method and process of the present invention depicted in FIGS. 2A-2C, an administrator employs user specification module 152 to specify or otherwise designate approved users of the electronic purchase request system 100. Similarly, an administrator may designate groups of users, such as a particular department, or users working on a particular project, that may access the electronic purchase request system 100. The administrator also uses specification module 152 to stipulate an approval level of a specified user or the group of users. For example, one user may have the authority and approval level to order products with a cost of $5,000 or less, while other users within the designated group may have the authority to order products with a cost of $25,000 or less. Similarly, approval levels may be stipulated on a temporal basis, such as a user may have the authority to make up to $50,000 of purchases per month. Other users may have greater or lesser authority, depending upon the approval level stipulated by the administrator.

The administrator uses routing module 182 to define routing actions based on the approval level and identity of the specified user. That is, the administrator defines actions to be taken to process purchase requests based upon the type and content of the purchase request and the identity and approval level of the user submitting the purchase request. For example, if a user who is approved to make purchases of $5,000 or less submits a purchase request for a product with a cost of $2,500, the defined routing action may be to automatically approve the purchase request, generate order collaterals for the vendor, and submit the purchase request and order collaterals to the vendor for immediate fulfillment. The order collaterals may be a completed order form, a record of the purchaser's credit card information, a PayPal message exchange, a purchase order, or other collaterals used as instruments to order goods or services. Alternatively, if the same user were to submit a purchase request for a product with a cost of $7,500, the defined routing action may be to automatically forward the purchase request to a manager with a higher authority and approval level who could then sign off on the purchase. Once the manager signed off her approval, the defined routing actions may the automatically direct that a purchase order to the vendor be generated, and that the purchase request and purchase order to the vendor be immediately submitted. Similarly, routing actions may be defined to direct all purchase requests for a particular class of products to flow through a particular user other than the originating user. For example, all products ordered from technology vendors must be ordered by the IT Director regardless of who the originating user may be, or in which project the technology product may be used. Defined routing actions may be pre-set by the administrator or may be added, modified, or deleted during the life cycle of the purchase request system 100.

A user will initiate a purchase request by submitting a transaction to interface module 172. A user may initiate a purchase request using display module 162 to view, select, and submit a transaction request to the interface module 172. Display module 162 may display a vendor's entire catalog of products or may be customized to display only those products for which the originating user has the authorization to order. In the above example, for instance, the $2,500 product would be displayed by display module 162, while the $7,500 product would not be accessible by the user with a $5,000 authorization level. Additional access and selection filters may also be employed and carried out by display module 162.

Interface module 172 receives submitted transactions and submitted purchase requests by a user to purchase a product. Payment module 192 identifies available payment options that the user may select with which to purchase the product in question. Different users may have access and authority to use different payment options as stipulated by the administrator and defined by the routing actions. Alternatively, users may choose to use instant payment options such as using their personal credit card or a company-issued credit card, or other forms of instant payments available to the user to make purchases. Other instant payment options may include, for example, PayPal, debit cards, and the like. The user selects an available payment options using the payment module 192 with which to complete the transaction.

Routing module 182 is used to determine if a submitted purchase request complies with the approval level of the specified user and the nature of the purchase request, for example the type of product that is to be purchased, and accepts the submitted purchase request if routing module 182 determines that the submitted purchase request complies with the approval level of the specified user. Routing module 182 then routes the submitted purchase request based on the defined routing actions.

Payment module 192 then provides required payment information or pre-formatted requisition information to the vendor to ultimately purchase the requested product. Similarly, payment module 192 may also receive materials from a vendor confirming the order, updating shipping information, and otherwise tracking the purchase.

Although an example embodiment of the application provider system 120, and the user computing systems 112a, 112b is described and illustrated herein, each of application provider system 120, and user computing systems 112a, 112b of the present invention may be implemented on any suitable computer system or computing device. It is to be understood that the devices and systems of the exemplary embodiments of the present invention are for exemplary purposes, as many variations of the specific hardware and software used to implement the exemplary embodiments are possible, as will be appreciated by those skilled in the relevant art.

Furthermore, each of the systems of the present invention may be conveniently implemented using one or more general purpose computer systems, microprocessors, digital signal processors, micro-controllers, and the like, programmed according to the teachings of the present invention as described and illustrated herein, as will be appreciated by those skilled in the computer and software arts.

In addition, two or more computing systems or devices can be substituted for any one of the systems in any embodiment of the present invention. Accordingly, principles and advantages of distributed processing, such as redundancy, replication, and the like, also can be implemented, as desired, to increase the robustness and performance of the devices and systems of the exemplary embodiments. The present invention may also be implemented on computer system or systems that extend across any communications network using any suitable interface mechanisms and communications technologies including, for example, telecommunications in any suitable form (e.g., voice, modem, and the like), wireless communications media, wireless communications networks, cellular communications networks, G3 communications networks, Public Switched Telephone Network (PSTNs), Packet Data Networks (PDNs), the Internet, intranets, a combination of the above, and the like.

The present invention may also be embodied as a computer readable medium having instructions stored thereon for automating purchase requests as described herein, which when executed by a processor, cause the processor to carry out the steps necessary to implement the methods of the present invention as described and illustrated herein.

For example, the computer-readable medium with computer-executable instructions for electronically purchasing a product may include instructions for specifying a user, instructions for stipulating an approval level of the user, and instructions for defining routing actions based on the approval level and identity of the specified user. Further, the computer-readable medium may include instructions for submitting a transaction by the specified user to purchase the product, instructions for identifying payment options to complete the transaction based upon the submitted transaction and the specified user, instructions for selecting an identified payment option, and instructions for submitting a purchase request by the specified user, indicating the selected payment option. Likewise, the computer-readable medium may include instructions for determining if the submitted purchase request complies with the stipulated approval level of the specified user, instructions for accepting the submitted purchase request if it is determined that the submitted purchase request complies with the stipulated approval level of the specified user, and instructions for routing the submitted purchase request based on the defined routing actions if it is determined that the submitted purchase request does not comply with the stipulated approval level of the specified user. Additionally, the computer-readable medium may include instructions for purchasing the product if the submitted purchase request was accepted and instructions for taking the defined routing if the submitted purchase request does not comply with the stipulated criteria, such as the approval level of the specified user.

The operation of the system in accordance with embodiments of the present invention will now be described with reference to FIGS. 2A, 2B, and 2C. In the following exemplary description, the purchase request system 100 is used to purchase a product. As used throughout this disclosure, the term "product" refers to any good or service, tangible or intangible that may be offered for sale or exchange. For purposes of clarity and brevity, the disclosure uses the term "product" in all such sales and exchange transactions.

In step 302, a user at one of the user computing systems 112a, 112b accesses an application from the application provider system 120, such as a purchase request application. Further in step 302, the application provider system 120, or one of the user computing systems 112a, 112b being utilized, enables the administrator to enter the payment method options, account information, and shared financial account information for each payment method. The administrator may enter the available payment methods and payment information using payment module 192, which may also be used to afford electronic funds transfers between the enterprise and the vendor to ultimately purchase the requested product.

In step 304, the application provider system 120 or the one of the user computing systems 112a, 112b enables the administrator to create a divisional hierarchy of the organization and group structure for permissions, although other structures for permissions are also possible. The administrator may use specification module 152 to specify or otherwise designate approved users and groups of the electronic purchase request system 100. An administrator may designate groups of users, such as a particular department, or particular users working on a particular project, or any hierarchical or organizational structure depending upon the needs of the enterprise, division, or project team that may access the electronic purchase request system 100.

In step 306, the administrator defines the spending limits of each user, group, or division based on a per transaction basis or in aggregate. The administrator uses specification module 152 to stipulate the spending limits and approval levels of the specified user or the groups of users. As discussed in the above example, one user may have the authority and approval level to order products with a cost of $5,000 or less, while other users within the designated group may have the authority to order products with a price of $25,000 or less. Similarly, approval levels may be stipulated on a temporal basis, such as a user may have the authority to make up to $50,000 of purchases per month. Other users may have greater or lesser authority, depending upon the approval level stipulated by the administrator and the requirements of the enterprise.

Once the approval limits are set, the administrator then defines routing actions in step 308 for transactions that exceed the approval limits. The administrator uses routing module 182 to define routing actions based on the approval level and identity of the specified user. That is, the administrator defines actions to be taken to process purchase requests based upon the type and content of the purchase request and the identity and approval level of the user submitting the purchase request. Similarly, routing actions may be defined to direct all purchase requests for a particular class of products to flow through a particular user other than the originating user. Likewise, routing actions may be defined to direct all purchase requests for a particular vendor to flow through a particular user other than the originating user. Defined routing actions may be pre-set by the administrator or may be added, modified, or deleted during the life cycle of the purchase request system 100.

As discussed above, in step 308, the administrator also defines what actions the system should take when a given user exceeds a transaction limit. The system can take actions including but not limited to automatically rejecting the request, manually rejecting the request and providing a reason for the rejection, sending the request to another user for approval, and sending the request to a manager for approval.

In step 310, a user at one of the user computing systems 112a, 112b uses the application from the application provider system 120, to attempt to complete a transaction. The user initiates a transaction request by submitting a transaction to interface module 172. A user may initiate a purchase request and use display module 162 to view, select, and submit a transaction request to the interface module 172.

In step 312, the system 100 queries purchase options. The process of the present invention then moves to step 314 where the system 100 returns available purchase options to the user. Payment module 192 identifies available payment options that the user may select with which to purchase the product in question. Different users may have access and authority to use different payment options as stipulated by the administrator and defined by the routing actions. These options include, but are not limited to personal credit card, corporate credit card, debit card, ACH transfer, PayPal, gBuy, line of credit, purchase request, short-term loan, long-term loan, and the like. In step 316, the user selects one of the payment options.

Continuing to FIG. 2B, if the user chooses an instant payment option in step 318, the system 100 confirms that the instant payment option meets the pre-set criteria established by the administrator. For example, that the particular user is allowed to make an instant payment for the particular transaction in question. If the instant payment option meets the criteria established by the administrator in step 319, the user makes the instant payment in step 320, and the purchase is complete in step 334. If an instant payment option does not comply with the pre-set criteria in step 319, the user is required to select an alternative payment option in step 366 when the process returns to step 318. If the user did not select the instant payment option in step 318, the purchase request system is selected in step 322. Optionally, the system administrator may disable display of available payment options for transactions. Users may simply enter purchase request information and submit the purchase request. The submitted purchase request may be processed based on pre-set criteria established by the administrator. Routing module 182 may be used in conjunction with payment module 192 to determine the appropriate payment option without input from the user.

In step 324 the user enters purchase request information, the purchase request is submitted to the system 100, and the purchase request is processed based on pre-set criteria established by the administrator. Routing module 182 determines if a submitted purchase request complies with the pre-set criteria established by the administrator. For example, the pre-set criteria may include the approval level of the specified user and the nature of the purchase request, for example the type of product that is to be purchased.

Referring to FIG. 2C, if the routing module 182 determines that the purchase request complies with the pre-set criteria in step 326, the purchase request is accepted in step 330. In step 332, the user and/or administrator receives a confirmation that the purchase request was accepted, and the routing module 182 and payment module 192 are updated to reflect the newest purchase in the procurement system 100, and the purchase request is complete in step 394.

If, in step 326, the purchase request does not comply with the preset criteria, in step 328 the purchase request is automatically routed via routing module 182 based on the defined routing actions in the pre-set criteria established by the administrator. Additional action is then taken based upon the routing. For example, if the purchase request does not comply with the preset criteria, the routing rules may dictate that the purchase request be forwarded to another user for review. If the purchase request was declined because the purchase request was for a higher dollar amount than the user was authorized to spend, for example, the routing rules may dictate that the purchase request be routed to another user with a higher dollar amount authorization. Similarly, if the submitting user was authorized to perform a certain number of transactions within a given time period, the routing rules may dictate that the purchase request be forwarded to another user with "available" transactions. Routing rules may be established to address contingencies based upon the requirements of the enterprise.

The purchase request is properly routed in step 328 to include review of the non-compliant individual purchase request in step 336. In step 338, an administrator determines whether they would like to review any of the pre-set criteria in place in the system. For example, if a particular user is routinely submitting purchase requests for purchases slightly above their pre-set approval limit, the administrator may wish to change the pre-set approval limit for that user.

If the administrator does not wish to review any of the pre-set criteria in step 338, the process proceeds to step 340 where the administrator decides whether to approve the non-compliant purchase request. If the administrator approves the purchase request, the administrator overrides the pre-set criteria in step 342 to complete a one-time approval of the purchase request. If the administrator performs a one-time authorization of the purchase request, the system will override the pre-set criteria specified in step 326 to allow the single purchase request to complete and route the purchase request directly to step 330 to accept the purchase request. The administrative override applies to the current purchase request only and does modify the pre-set criteria of the user. Once the non-compliant purchase request is approved, it is accepted by the system in step 330, and in step 332, the user and administrator are notified of the accepted purchase request, and the purchase request operation is complete in step 394.

If the administrator does want approve the purchase request in step 340, the purchase request is denied in step 350, and in step 352, the user and administrator are notified of the declined purchase request, and the purchase request operation is complete in step 394.

As indicated above, if an administrator wishes to review any of the pre-set criteria in step 338, the administrator determines if they want to adjust any of the pre-set criteria in step 344, for example to enable approval of the pending purchase request and others in the future that would conform to the new criteria. These administrative adjustments to the user's pre-set criteria will apply to future purchase requests unless administrative intervention is performed to modify the settings in the future. If the administrator chose to adjust the preset criteria, the adjustment is made in step 346, and the purchase request is resubmitted with the new pre-set criteria in step 348. The process then evaluates the purchase request using the new criteria in step 326 and routes the purchase request accordingly. If, however, the administrator does not want to adjust the pre-set criteria in step 344, the purchase request is denied in step 350, the user and administrator are notified of the declined purchase request in step 352, and the process is complete in step 394.

As above, once the purchase request is accepted, in step 332 the users receive confirmation that the purchase was accepted, and the routing module 182 and payment module 192 are updated to reflect the newest purchase in the procurement system 100, and the purchase is complete in step 334.

During the time that the purchase request is being routed based on the pre-set criteria in step 328, the user may be automatically notified of the status of the purchase request, or the user may access information regarding the status of the purchase request manually. The user may check on the status of any administrative review by reviewing the purchase request system application. The administrator or other designee receives a notification of required actions by means such as email, sms, instant message, web page notification, and the like. Regardless of the notification means, the purchase request remains active until its disposition, based upon the routing rules established to enact the administrator's pre-set purchase request completion criteria.

The devices and subsystems of the exemplary embodiments of FIGS. 1 and 2 are for exemplary purposes, as many variations of the specific hardware used to implement the exemplary embodiments are possible, as will be appreciated by those skilled in the relevant arts. For example, the functionality of one or more of the devices and subsystems of the exemplary embodiments of FIGS. 1 and 2 can be implemented via one or more programmed computer systems or devices. On the other hand, two or more programmed computer systems or devices can be substituted for any one of the devices and subsystems of the exemplary embodiments of FIGS. 1 and 2. Accordingly, principles and advantages of distributed processing, such as redundancy, replication, and the like, also can be implemented, as desired, to increase the robustness and performance of the devices and subsystems of the exemplary embodiments of FIGS. 1 and 2.

The devices and subsystems of the exemplary embodiments of FIGS. 1 and 2 can store information relating to various processes described herein. This information can be stored in one or more memories, such as a hard disk, optical disk, flash drive, magneto-optical disk, RAM, and the like, of the devices and subsystems of the exemplary embodiments of FIGS. 1 and 2. One or more databases of the devices and subsystems of the exemplary embodiments of FIGS. 1 and 2 can store the information used to implement the exemplary embodiments of the present invention.

All or a portion of the devices and subsystems of the exemplary embodiments of FIGS. 1 and 2 can be conveniently implemented using one or more general purpose computer systems, microprocessors, digital signal processors, micro-controllers, and the like, programmed according to the teachings of the exemplary embodiments of the present invention, as will be appreciated by those skilled in the computer and software arts. In addition, the devices and subsystems of the exemplary embodiments of FIGS. 1 and 2 can be implemented by the preparation of application-specific integrated circuits or by interconnecting an appropriate network of conventional component circuits, as will be appreciated by those skilled in the electrical arts. Thus, the exemplary embodiments are not limited to any specific combination of hardware circuitry and/or software.

Additionally, network transmission media can include coaxial cables, copper wire, fiber optics, and the like. Network transmission media also can take the form of acoustic, optical, electromagnetic waves, and the like, such as those generated during radio frequency (RF) communications, infrared (IR) data communications, and the like.

The foregoing description of exemplary aspects and embodiments of the present invention provides illustration and description, but is not intended to be exhaustive or to limit the invention to the precise form disclosed. Those of skill in the art will recognize certain modifications, permutations, additions, and combinations of those embodiments are possible in light of the above teachings or may be acquired from practice of the invention. Therefore, the present invention also covers various modifications and equivalent arrangements that would fall within the purview of appended claims and claims hereafter introduced.

Accordingly, as described herein the present invention is able to provide an effective and automatic method for users of a Web-based or client-server software application to automate a purchase request and approval process. As described herein, these transactions can be single purchases of a product such as a good or service, or for recurring purchases.

The present invention is versatile and can be used for a wide range of purchasing products, such as goods and services, including, but not limited to physical products, software, digital media, services, professional services work, consulting work, projects, recurring cost services, and repeated purchases.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for facilitating automated product procurement according to established authorization level data, the method comprising:

receiving by a processor of an application provider apparatus a purchase request to purchase at least one product, the purchase request submitted by a specified user within a group of users in a business enterprise and via a shopping cart of a Website, wherein the shopping cart includes transaction detail data comprising the purchase request;

determining and providing by the processor of the application provider apparatus payment option data comprising one or more of a plurality of payment options available for use by the specified user based on an established authority of the specified user;

receiving by the processor of the application provider apparatus a selection of one of the one or more provided payment options from the specified user;

determining by the processor of the application provider apparatus the submitted purchase request does not comply with stipulated approval level data for the specified user based at least in part on at least a portion of the transaction detail data, without user intervention, wherein the stipulated approval level data comprises a level of purchasing authority of the specified user based on designation data for the specified user comprising a designation of the user within the business enterprise, the level of purchasing authority comprising a maximum allowable number of purchase requests for the specified user within a specified time period; and denying by the processor of the application provider apparatus the submitted purchase request and transferring the transaction detail data comprising the purchase request from the shopping cart to a computing device associated with another of the group of users having associated authority data indicating an authority to submit the purchase request within the specified time period based on an obtained number of purchase requests previously-submitted by the other of the group of users within the specified time period.

2. The method of claim 1, further comprising:
providing by the processor of the application provider apparatus a vendor with a proof of purchase based upon the accepted purchase request.

3. The method of claim 2, wherein the proof of purchase based upon the accepted purchase request includes a purchase order.

4. The method of claim 2, further comprising:
receiving by the processor of the application provider apparatus a proof of receipt of the purchase from the vendor.

5. The method of claim 1, further comprising:
connecting by the processor of the application provider apparatus the specified user to a vendor and displaying products available for electronic purchase.

6. The method of claim 5, wherein the connection of the specified user to a vendor is made over a communications network and the displayed products available for electronic purchase of the specified user are products from a catalog of the vendor.

7. The method of claim 1, further comprising one or more of holding, by the processor of the application provider apparatus, the purchase request for review, generating, by the processor of the application provider apparatus, order collaterals and submitting, by the processor of the application provider apparatus, the purchase request and order collaterals to a vendor for fulfillment, or identifying, by the processor of the application provider apparatus, one of a plurality of classes of products associated with the purchase request and directing the purchase request to a particular one of the group of users based on the identified one of the plurality of classes of products, when the determining indicates that the submitted purchase request does not comply with the stipulated approval level data.

8. The method of claim 1, wherein the product being purchased includes recurring services that do not have a fixed dollar amount.

9. The method of claim 8, wherein the recurring services are Web-based.

10. A non-transitory computer-readable medium having stored thereon instructions for facilitating automated product procurement according to established authorization level data, comprising executable code which when executed by one or more processors, causes the one or more processors to:

receive a purchase request to purchase at least one product, the purchase request submitted by a specified user within a group of users in a business enterprise and via a shopping cart of a Website, wherein the shopping cart includes transaction detail data comprising the purchase request;

determine and provide payment option data comprising one or more of a plurality of payment options available for use by the specified user based on an established authority of the specified user;

receive a selection of one of the one or more provided payment options from the specified user;

determine the submitted purchase request does not comply with stipulated approval level data for the specified user based at least in part on at least a portion of the transaction detail data, without user intervention, wherein the stipulated approval level data comprises a level of purchasing authority of the specified user based on designation data for the specified user comprising a designation of the user within the business enterprise, the level of purchasing authority comprising a maximum allowable number of purchase requests for the specified user within a specified time period; and deny the submitted purchase request and transfer the transaction detail data comprising the purchase request from the shopping cart to a computing device associated with another of the group of user having associated authority data indicating an authority to submit the purchase request within the specified time period based on an obtained number of purchase requests previously-submitted by the other of the group of users within the specified time period.

11. The computer-readable medium of claim 10, wherein the executable code when executed by the one or more processors further causes the one or more processors to provide a vendor with a proof of purchase based upon the accepted purchase request.

12. The computer-readable medium of claim 11, wherein the proof of purchase based upon the accepted purchase request includes a purchase order.

13. The computer-readable medium of claim 11, wherein the executable code when executed by the one or more processors further causes the one or more processors to receive a proof of receipt of the purchase from the vendor.

14. The computer-readable medium of claim 10, wherein the executable code when executed by the one or more processors further causes the one or more processors to connect the specified user to a vendor and displaying products available for electronic purchase.

15. The computer-readable medium of claim 14, wherein the connection of the specified user to a vendor is made over a communications network and the displayed products available for electronic purchase are products from a catalog of the vendor.

16. The computer-readable medium of claim 10, wherein the executable code when executed by the one or more processors further causes the one or more processors to hold the purchase request for review, generate order collaterals and submitting the purchase request and order collaterals to a vendor for fulfillment, or identify one of a plurality of classes of products associated with the purchase request and directing the purchase request to a particular one of the group of users based on the identified one of the plurality of classes of products, when the determining indicates that the submitted purchase request does not comply with the stipulated approval level data.

17. The computer-readable medium of claim 10, wherein the product being purchased includes recurring services that do not have a fixed dollar amount.

18. The computer-readable medium of claim 17, wherein the recurring services are Web-based.

19. An application provider apparatus comprising memory comprising programmed instructions stored thereon and one or more processors configured to be capable of executing the stored programmed instructions to:
    receive a purchase request to purchase at least one product, the purchase request submitted by a specified user within a group of users in a business enterprise and via a shopping cart of a Website, wherein the shopping cart includes transaction detail data comprising the purchase request;
    determine and provide payment option data comprising one or more of a plurality of payment options available for use by the specified user based on an established authority of the specified user;
    receive a selection of one of the one or more provided payment options from the specified user;
    determine the submitted purchase request does not comply with stipulated approval level data for the specified user based at least in part on at least a portion of the transaction detail data, without user intervention, wherein the stipulated approval level data comprises a level of purchasing authority of the specified user based on designation data for the specified user comprising a designation of the user within the business enterprise, the level of purchasing authority comprising a maximum allowable number of purchase requests for the specified user within a specified time period;
    and
    deny the submitted purchase request and transfer the transaction detail data comprising the purchase request from the shopping cart to a computing device associated with another of the group of user having associated authority data indicating an authority to submit the purchase request within the specified time period based on an obtained number of purchase requests previously-submitted by the other of the group of users within the specified time period.

20. The apparatus as set forth in claim 19 wherein the one or more processors are further configured to be capable of executing the stored programmed instructions to provide a vendor with a proof of purchase based upon the accepted purchase request.

21. The apparatus as set forth in claim 20 wherein the proof of purchase based upon the accepted purchase request includes a purchase order.

22. The apparatus as set forth in claim 20 wherein the one or more processors are further configured to be capable of executing the stored programmed instructions to receive a proof of receipt of the purchase from the vendor.

23. The apparatus as set forth in claim 19 wherein the one or more processors are further configured to be capable of executing the stored programmed instructions to connect the specified user to a vendor and displaying products available for electronic purchase.

24. The apparatus as set forth in claim 23 wherein the connection of the specified user to a vendor is made over a communications network and the displayed products available for electronic purchase are products from a catalog of the vendor.

25. The apparatus as set forth in claim 19 wherein the one or more processor are further configured to be capable of executing the stored programmed instructions to hold the purchase request for review, generate order collaterals and submitting the purchase request and order collaterals to a vendor for fulfillment, or identify one of a plurality of classes of products associated with the purchase request and directing the purchase request to a particular one of the group of users based on the identified one of the plurality of classes of products, when the determining indicates that the submitted purchase request does not comply with the stipulated approval level data.

26. The apparatus as set forth in claim 19 wherein the product being purchased includes recurring services that do not have a fixed dollar amount.

27. The apparatus as set forth in claim 26 wherein the recurring services are Web-based.

* * * * *